Figure 1:
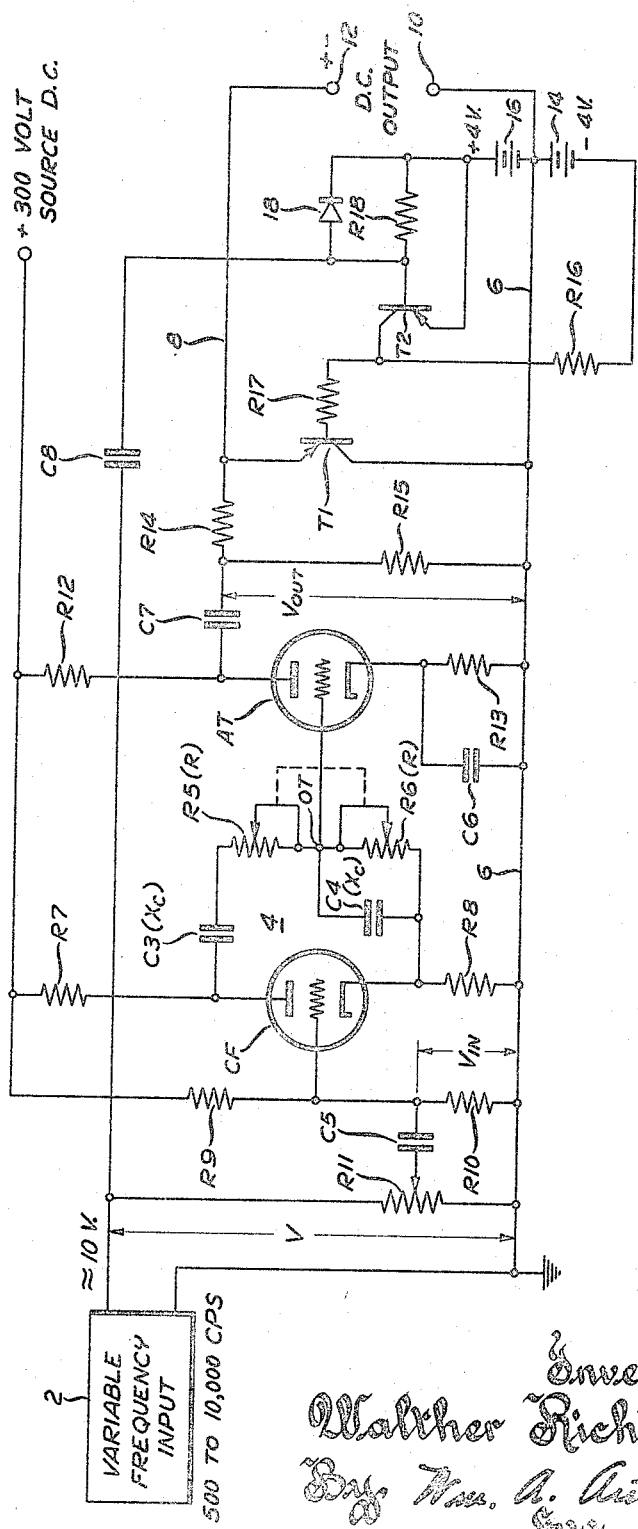

Inventor
Walther Richter
By Wm. A. Autio
Attorneys

Inventor
Walther Richter

United States Patent Office 3,332,023
Patented July 18, 1967

3,332,023
FREQUENCY SENSITIVE SYSTEM
Walther Richter, River Hills, Wis., assignor to Cutler,
Hammer, Inc., Milwaukee, Wis., a corporation of
Delaware
Filed Mar. 6, 1964, Ser. No. 349,838
18 Claims. (Cl. 328—140)

This invention relates to frequency sensitive systems and more particularly to systems for sensing variation in frequency from a predetermined value and for providing an output signal having a polarity indicative of the direction of variation and a magnitude indicative of the amount of variation.

While not limited thereto, the invention is especially applicable to adjustment of a motor speed over a wide range and regulation of the speed at the selected value to an accuracy of a very small percentage.

An object of the invention is to provide an improved frequency sensitive system.

A more specific object of the invention is to provide improved means for sensing variation of the frequency of an input alternating signal from a preselected value and for providing an output signal having a polarity indicative of the direction of frequency variation and a magnitude proportional to the amount of variation.

Another object of the invention is to provide an improved phase sensitive detector.

Another specific object of the invention is to provide a solid state detector for shunting alternate half-cycles of an alternating voltage and for providing an output signal having a polarity which is a function of the phase of the alternating voltage.

Other objects and advantages of the invention will hereinafter appear.

According to the invention, there is provided a system for receiving a variable frequency electrical input signal and for providing a direct current output signal which is a function of the variation of the input signal frequency from a preselected value. The system is provided with a means such as a cathode follower to which the variable frequency input signal is applied for providing in-phase and inverted-phase voltages. A modified Wien bridge is connected to the cathode follower and is provided with adjusting means for selecting the frequency from which a variation in the input frequency is to be sensed. The output of the modified Wien bridge is connected to a buffer amplifier. The A.C. output of the amplifier is applied to a solid state phase sensitive detector to provide a unidirectional output signal indicative of any variation in the frequency of the input signal from a preselected value.

The phase sensitive detector utilizes the input signal frequency as a reference frequency. Since the output of the Wien bridge either lags or leads the input signal by 90 degrees depending upon whether the input frequency is above or below the value selected on the Wien bridge, the reference input to the phase sensitive detector must be shifted 90 degrees in phase so that the half-cycles of reference input coincide with the half-cycle of amplifier output. In this manner, alternate half-cycles of the reference input can be used to cancel alternate half-cycles of the amplifier output. What is left then at the output terminals of the detector is a series of spaced half-cycles all of the same polarity. This polarity is positive if the input frequency is higher than the preselected frequency. This polarity is negative if the input frequency is lower than the preselected frequency. In this manner, the detector provides a reversible polarity direct current output which can be used to regulate the input frequency so as to counteract any variation therein. The amplitude of the output half-cycles is proportional to the difference between the input frequency and the preselected frequency. Accordingly, the output error signal not only has the proper polarity but also has a variable magnitude to afford increasing correction for increasing variation from the preselected frequency.

Figure 2:
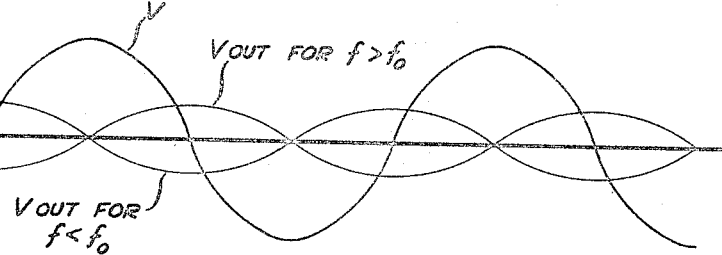
Figure 2:
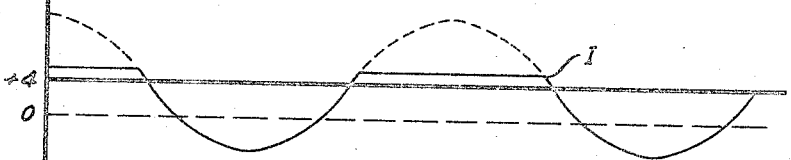
Figure 2:
Figure 2:
Figure 3:
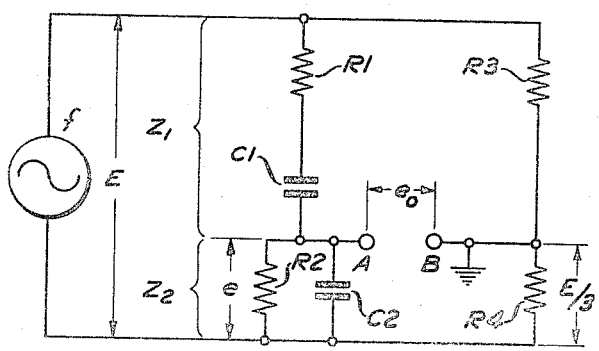

The aforementioned and other objects and advantages of the invention and the manner of obtaining them will best be understood by reference to the following description of an exemplary embodiment of a frequency sensitive system including a solid state phase sensitive detector taken in conjunction with the accompanying drawings, wherein:

FIGURE 1 is a circuit diagram of a frequency sensitive system constructed in accordance with the invention;

FIG. 2 graphically illustrates certain operating characteristics of the system of FIG. 1; and FIG. 3 shows a known Wien bridge.

Referring to FIG. 1, there is a variable frequency input device 2 illustrated as a rectangle. This variable frequency device 2 may take various forms. For example, in an open loop system, it may be an audio oscillator having an adjustable frequency whereby the system provides a unidirectional error signal indicative of input frequency adjustment from a preselected value. In a closed loop system, device 2 may be an alternating current generator driven by an electric motor whose speed is to be regulated at a preselected value. In such system, whenever the motor speed varies from a preselected value, the generator exhibits a corresponding frequency deviation from the value selected and the detector provides an error or feedback signal to regulate the motor speed and to maintain it accurately at the selected value.

The system in FIG. 1 is provided with means for sensing a deviation from a preselected value in the input frequency and for providing a phase-shifted signal indicative thereof, means for isolating and amplifying the phase-shifted signal and means for detecting the amplified signal to provide a unidirectional output signal.

The frequency deviation sensing means comprises a modified Wien bridge circuit 4. A Wien bridge circuit is a resistance-capacitance bridge circuit which is in balance for an input frequency at which its capacitance reactance is equal to its resistance. At balance, the bridge circuit provides no output voltage. When the input frequency is increased or decreased from the balancing frequency, the bridge circuit will be unbalanced due to the change in capacitive reactance and will provide an output voltage respectively lagging or leading the input voltage by 90 degrees. For an illustration of a known Wien bridge circuit, reference may be had to page 992 of the International Dictionary of Physics and Electronics and to FIG. 3.

To facilitate understanding of the system of FIG. 1, the Wien bridge circuit shown in FIG. 3 will first be described.

The circuit in FIG. 3 is supplied from an alternating current source having a voltage $E$ and a frequency $f$ and the output voltage $e_0$ appears across terminals A and B. Frequency sensing is performed by an RC series-parallel circuit having a resistor R1 and a capacitor C1 connected in series and a resistor R2 and a capacitor C2 connected in parallel. Resistor R1 is connected to one side of the source. Resistor R2 and capacitor C2 are connected to the other side of the source. Capacitor C1 is connected to resistor R2 and capacitor C2 and to output terminal A. Output terminal B is grounded and is connected to a voltage divider comprising resistors R3 and R4 in series across the source. For reasons which will become apparent hereinafter, resistor R3 has twice the value of resistor R4 so that the voltage across the latter will be ⅓ of the source voltage as indicated in FIG. 3.

Analysis of the Wien bridge

In the circuit of FIG. 3, resistors R1 and R2 have equal resistance values hereinafter designated as R. Capacitors C1 and C2 have equal capacitive reactance values hereinafter designated as $Xc$. The impedance of the series portion of the $RXc$ circuit is $Z_1$ and the impedance of the parallel portion of the $RXc$ circuit is $Z_2$ as indicated in FIG. 3. The voltage across impedance $Z_2$ is designated as $e$ and is defined by the following equation:

(1) $$e = E\left(\frac{Z_2}{Z_1+Z_2}\right) = E\left(\frac{1}{1+\frac{Z_1}{Z_2}}\right)$$

Since $Z_1 = R - jXc$ and $$Z_2 = \frac{-jRXc}{R-jXc}$$

then $$\frac{Z_1}{Z_2} = \frac{(R-jXc)^2}{-jRXc} = \frac{R^2 - Xc^2 - 2jRXc}{-jRXc} = 2 + j\left(\frac{R}{X_c} - \frac{X_c}{R}\right)$$

which when substituted into (1) results in:

(2) $$e = E\left(\frac{1}{3+j\left(\frac{R}{X_c}-\frac{X_c}{R}\right)}\right) = \frac{E}{3}\frac{1}{1+\frac{j}{3}\left(\frac{R}{X_c}-\frac{X_c}{R}\right)}$$

If the frequency $f$ at which the capacitance reactance $Xc$ becomes numerically equal to the resistance R is designated as $f_0$, and since $W = 2\pi f$, then $$Wo = 2\pi f_0$$

It is known that:

(3) $$\frac{1}{WoC} = R$$

or $WoRC = 1$

Since $R/Xc$ at frequency $f_0$ is equal to 1, then (4) $$\frac{R}{X_c} = RCW$$

at frequency $f$

If Equation 4 is multiplied by $Wo/Wo = 1$, it becomes:

$$\frac{R}{X_c} = \frac{RCWW_0}{W_0}$$

Substituting 1 for $RCWo$ from Equation 3, then (5) $$\frac{R}{X_c} = \frac{W}{W_0} = \frac{f}{f_0}$$

Substituting 5 into 2, then (6) $$e = \frac{E}{3}\left(\frac{1}{1+\frac{j}{3}\left(\frac{f}{f_0}-\frac{f_0}{f}\right)}\right)$$

For $f = f_0$, Equation 6 becomes $e = E/3$. Since the voltage across R4 is $E/3$, at this frequency the unbalanced voltage $e_o$ of the bridge becomes zero.

It will now be determined what unbalanced voltage $e_o$ will appear between terminals A and B when the applied frequency $f$ deviates a small amount from the value $f_0$, that is, from the frequency at which the bridge is in balance and $e_o$ is zero. This is most conveniently done by expressing $f$ with the aid of the following equation:

(7) $$f = f_0(1+p)$$

where $p \ll 1$, that is, where $p$ is very much smaller than 1 or a small percentage of 1. For example, $p = 0.01$ is equivalent to saying that $f$ is one percent larger than $f_0$.

For values of $p$ very much smaller than one, the following well known approximation can be made:

(8) $$\frac{1}{1+p} \approx 1-p$$

Substituting (7) into an expression in (6), then (9) $$\frac{f}{f_0} - \frac{f_0}{f} = \frac{f_0(1+p)}{f_0} - \frac{f_0}{f_0(1+p)} = (1+p) - \frac{1}{1+p}$$

and substituting (8) into (9), then

(10) $$\frac{f}{f_0} - \frac{f_0}{f} = 1+p-1+p = 2p$$

Substituting (10) into (6), then

(11) $$e = \frac{E}{3}\left(\frac{1}{1+j\frac{2p}{3}}\right)$$

Since $2p/3$ is also very much smaller than one, use can again be made of the approximation in Equation 8, where (11) becomes:

(12) $$e = \frac{E}{3}\left(1-j\frac{2}{3}p\right) = \frac{E}{3} - j\frac{2}{9}pE$$

Since the unbalanced voltage $e_o = e - E/3$, then $$e_o = -j\frac{2}{9}pE = -j(.222)pE$$

For a 1 percent deviation in frequency from the value at balance, $p = 0.01$ and, therefore, $$e_o = -j(.0022)E$$

This last equation shows that for a 1 percent change in frequency, an unbalanced voltage equal to .22 percent of the applied voltage will appear between terminals A and B of the bridge. For an applied voltage of 10 volts, for example, this would be 22 milli-volts. This bridge output voltage lags the applied voltage by 90 degrees when the frequency is higher than $f_0$ and leads the applied voltage by 90 degrees when the frequency is lower than $f_0$.

Referring to FIG. 1, the modified Wien bridge circuit shown therein is provided with a frequency sensing circuit comprising a series portion having a capacitor C3 and an adjustable resistor R5 and a parallel portion having a capacitor C4 and an adjustable resistor R6. The movable taps on resistors R5 and R6 are mechanically connected to one another for movement in unison as indicated by the broken line and are arranged to track with each other so that both resistances increase or decrease by equal amounts in the same direction when adjustment is made. The purpose of the adjustment is to preselect the frequency for which the output voltage of the modified Wien bridge circuit will be zero.

As shown in FIG. 1, the frequency sensing circuit just described is connected across a cathode follower tube CF. To this end, capacitor C3 of the series portion of such circuit is connected to the anode of tube CF. Capacitor C4 and resistor R6 of the parallel portion of such circuit are connected to the cathode of the tube CF. The balancing terminal or output terminal OT at the junction between the series and parallel portions, that is, between resistors R5 and R6 and capacitor C4, is connected to the grid of a buffer amplifier tube AT.

Cathode follower tube CF is provided with anode voltage from a plus 300 volt source D.C. through a resistor R7 and its cathode is connected through a load resistor R8 to grounded common conductor 6.

The cathode follower tube is provided with means for biasing it from conduction. This means comprises a voltage divider comprising resistors R9 and R10 connected in series from source D.C. to ground, the junction of these resistors being connected to the grid of tube CF.

While a cathode follower has been shown as an input device to the modified Wien bridge circuit, it will be apparent that an emitter follower, a one-third tapped transformer or other devices providing opposite phase voltages is contemplated by the inventor.

Means are provided for connecting the output of variable frequency input device 2 for controlling tube CF. This means comprises a potentiometer R11 and a coupling capacitor C5 connecting the output of device 2 to the grid of tube CF. One output conductor of device 2 is connected to ground at conductor 6. The other output conductor of device 2 is connected through the resistor of potentiometer R11 to conductor 6 and the movable tap of potentiometer R11 is connected through capacitor C5 to the grid of the tube CF.

Amplifier tube AT is provided with anode voltage from source D.C. through a load resistor R12 and the cathode thereof is connected through a resistor R13 and a capacitor C6 in parallel to common conductor 6. The alternating current output of the amplifier is connected from the anode of tube AT through a coupling capacitor C7 and a resistor R14 to a conductor 8, the junction of capacitor C7 and resistor R14 being connected through a resistor R15 to grounded conductor 6.

The phase sensitive detector is connected across conductors 8 and 6 and is supplied with a reference voltage from the ungrounded output conductor of variable frequency input device 2 through a phase-shifting capacitor C8. Conductor 6 is connected to a ground potential output terminal 10. Conductor 8 is connected to output terminal 12 which may provide a positive or negative voltage output relative to ground potential depending on the direction of frequency deviation, up or down.

It will be apparent from FIG. 1 that any alternating current output signal appearing at the anode of amplifier tube AT will pass through capacitor C7, resistor R14 and conductor 8 to output terminal 12 unless it is shunted therefrom. For this purpose, the phase sensitive detector is provided with switching means for shunting every second half-cycle of the amplifier output voltage from the output terminals and for allowing the remaining half-cycles to pass to the output terminals. Since only one-half of each cycle passes to the output terminals these half-cycles will all be of the same polarity to provide a unidirectional output signal.

For the above purposes the shunting means comprises a solid state device such as a transistor T1 of the P-N-P conductivity type or the like and control means therefor. The emitter of transistor T1 is connected to conductor 8 and its collector is connected to grounded conductor 6.

The control means for transistor T1 are connected to the base thereof. These control means comprise means for biasing transistor T1 for conduction to shunt the amplifier output and means for rendering transistor T1 nonconducting to allow the amplifier output to pass to the output terminals. The biasing means comprises a unidirectional voltage source such as a direct current battery 14 or the like having its positive side connected to grounded conductor 6 and having its negative side connected through current-limiting resistors R16 and R17 to the base of transistor T1. The means for rendering transistor T1 nonconductive comprises a solid state control device such as a transistor T2 of the P-N-P conductivity type or the like. A unidirectional voltage source such as a battery 16 or the like has its positive side connected to the emitter of transistor T2 and has its negative side connected to grounded conductor 6. The collector of transistor T2 is connected through load resistor R16 to the negative side of battery 14. The positive side of battery 16 is also connected through a resistor R18 to the base of transistor T2 to establish a reference voltage level from which the base of transistor is varied by an alternating control current. This control current is applied from the ungrounded output conductor of variable frequency input device 2 through phase-shifting capacitor C8 to the base of transistor T2. A unidirectional diode 18 is connected in its forward, low impedance direction from the base of transistor T2 to the emitter to provide a current path for that half-cycle of A.C. control current coming through capacitor C8, which cannot flow through the diode formed by the emitter and base of transistor T2, and to prevent the base voltage from going substantially more positive than the emitter voltage.

The operation of the system of FIG. 1 will now be described.

Let it be assumed that variable frequency device 2 provides an alternating current output of substantially 10 volts and that its frequency may be varied or varies from a predetermined value. The frequency from which a variation is to be detected is predetermined or selected by adjusting the taps on resistors R5 and R6. These resistors have equal resistance values such as 20 kilohms or the like and are adjusted together in equal amounts. Capacitors C3 and C4 may each have a capacitance value of .01 microfarad.

It will be apparent that a portion of the system in FIG. 1 is similar to the Wien bridge circuit in FIG. 3. The series portion comprising capacitor C3 and resistor R5 in FIG. 1 correspond to the series portion designated $Z_1$ in FIG. 3. The parallel portion comprising capacitor C4 and resistor R6 in FIG. 1 correspond to the parallel portion designated $Z_2$ in FIG. 3. Resistors R7 and R8 in FIG. 1 correspond to resistors R3 and R4, respectively, in FIG. 3. For this reason, resistor R7 has twice the resistance of resistor R8, being 10 kilohms compared to 5 kilohms in resistor R8.

Referring to FIG. 1, it will be seen that tube CF is biased on to a predetermined D.C. output level from which it is varied by an A.C. signal. Current flows from the direct current source D.C. through resistors R9 and R10 to ground. The unidirectional bias voltage appearing across resistor R10 is applied to the grid and cathode circuit to cause tube CF to conduct. An adjustable portion $V_{in}$ of variable frequency A.C. input signal V is applied from the tap of potentiometer R11 through capacitor C5 to the grid and cathode of tube CF to cause the output voltage of the tube to vary in accordance therewith. The alternating voltage at the cathode of the cathode follower tube is in phase with the input signal and the A.C. voltage at the anode of tube CF is inverted so that it is of opposite phase with respect to the input voltage, tube CF being in effect an alternating voltage inverter.

When the A.C. input signal has a frequency value such that the capacitive reactance Xc in modified Wien bridge 4 has a numerical value equal to resistance R, the signal at terminal OT is zero with respect to ground. It was seen in connection with FIG. 3, that at balanced frequency, the A.C. voltage across the parallel portion of the RXc circuit is equal to one-half of the A.C. voltage across the series portion of the RXc circuit. Since the resistance of resistor R8 of the voltage divider comprising resistors R7 and R8 is one-half of the resistance of resistor R7, the A.C. voltage across resistor R8, that is, from the cathode of tube CF to grounded conductor 6; is also one-half of the A.C. voltage across R7, grounded conductor 6 being an intermediate alternating voltage point. Consequently, the voltage at terminal OT relative to ground is of zero value.

When the frequency of the input voltage increases or decreases from the value selected at resistors R5 and R6, an A.C. output voltage relative to ground appears at terminal OT. This voltage at terminal OT has an amplitude proportional to the amount of frequency deviation for small percentages of deviation and a phase indicative of the direction of frequency deviation. This A.C. voltage is applied from terminal OT to the control grid of buffer amplifier tube AT, is amplified in tube AT and applied from the anode of the latter through coupling capacitor C7 and resistor R14 to output conductor 8, a portion of the output current flowing through resistor R15. Amplifier AT also isolates the modified Wien bridge circuit from the detector to prevent feedback thereto.

As has been shown in the analysis of the Wien bridge the output voltage at point OT is either lagging or leading the voltage V by 90 degrees, depending on whether the frequency of voltage V is above or below that selected by the setting of resistors R5 and R6, and therefore the buffer amplifier output voltage $V_{out}$ appearing across resistor R15 is also displaced 90 degrees relative to voltage V of variable frequency device 2 as shown in FIG. 2(a). This amplifier output voltage lags by 90 degrees when the frequency is higher than the preset value and leads by 90 degrees when the frequency is lower than the preset value.

In order to "detect" the phase of the amplifier output voltage $V_{out}$, it is necessary to have a reference current applied to the base of transistor T2 in phase therewith. Accordingly, a phase shifting capacitor C8 is used to obtain a control current to the base of transistor T2 which is displaced by 90 degrees with respect to the output voltage V of device 2. As shown in FIG. 2(b), capacitor C8 causes reference current I to lead voltage V of device 2 by 90 degrees. As a result, the amplifier output voltage is in phase with the reference current when the frequency is lower than the selected frequency and is 180 degrees out of phase with the reference current when the frequency is higher than the selected frequency as shown in FIGS. 2(a) and (b).

This reference current is applied to the phase sensitive detector or phase discriminator to operate the same. As shown in the right-hand portion of FIG. 1, battery 16 applies plus four volts to the emitter of transistor T2 relative to ground. Battery 14 applies minus four volts through resistor R16 to the collector of transistor T2 relative to ground. Battery 16 also applies plus four volts through resistor R18 to the base of transistor T2 to produce a bias current for the base of transistor T2 as shown in FIG. 2(b), whereby the reference current can turn transistor T2 on and off for equal 180 degree periods.

Diode 18 in FIG. 1 provides a path for the A.C. current coming through capacitor C8 which cannot flow through the emitter-base circuit of transistor T2 and clips the positive half-cycles of the reference voltage to prevent application of excessive reverse voltage on the emitter-base circuit of transistor T2. As shown in FIG. 2(b), diode 18 removes the dotted line portions of the positive half-cycles and limits the positive voltage at the base of transistor T2 to the sum of the four volts of battery 16 and the forward drop on diode 18 which is a fraction of a volt.

On each positive half-cycle, the reference current turns transistor T2 off. This allows minus four volts to be applied from battery 14 through resistors R16 and R17 to the base of transistor T1. This negative base voltage turns transistor T1 on and causes it to shunt the amplifier output voltage from output terminals 12 and 10 for a half-cycle as shown in FIGS. 2(c) and (d).

On each negative half-cycle, the reference voltage turns transistor T2 on. This causes current flow from the positive side of battery 16 through the emitter and collector and resistor R16 to the negative side of battery 14. If the drop across transistor T2 is negligible, substantially plus four volts is applied from the upper end of resistor R16 through resistor R17 to the base of transistor T1 to turn it off for a half-cycle. As a result, a half-cycle of amplifier output voltage is applied to the output terminals 12 and 10 as shown in FIGS. 2(c) and (d).

It will be apparent from the foregoing that the phase sensitive detector shunts every second half-cycle of the amplifier output regardless of whether such half-cycle is positive or negative and allows the intervening half-cycles to proceed to the output terminals. Therefore, when the frequency of device 2 is higher than the preselected frequency to provide a voltage, as shown in FIG. 2(a), positive voltage half-cycles as shown in FIG. 2(c) will appear at the output terminals. On the other hand, when the frequency of device 2 is lower than the preselected frequency to provide the opposite phase voltage shown in FIG. 2(a), negative voltage half-cycles shown in FIG. 2(d) will appear at the output terminals. Thus, the polarity of the output voltage is indicative of the direction of frequency deviation. The magnitude of the output voltage is proportional to the amount of frequency deviation from the preselected value for small deviations therefrom.

This D.C. output signal can then be used to indicate the amount and direction of frequency deviation or can be used as a feedback or correction signal to counteract the frequency deviation and restore or regulate the input frequency to the selected value. As indicated in FIG. 1, the system can be pre-adjusted at resistors R5 and R6 for any frequency in a 20 to 1 range from 500 to 10,000 cycles per second and the system will indicate or regulate any deviation therefrom.

While the system hereinbefore described is effectively adapted to fulfill the objects stated, it is to be understood that I do not intend to confine my invention to the particular preferred embodiment of frequency sensitive system disclosed, inasmuch as it is susceptible of various modifications without departing from the scope of the appended claims.

I claim:
1. In a frequency sensitive system for providing a D.C. output voltage indicative of deviation in frequency of an alternating input voltage from a predetermined value, the combination of:
   voltage inverter and voltage divider means responsive to the alternating input voltage for providing in-phase and phase-inverted alternating voltages proportional thereto and for providing an intermediate alternating voltage point dividing an alternating voltage proportional to the alternating input voltage into one-third and two-third portions;
   a balancing network;
   means for applying said in-phase and inverted phase voltages to opposite ends of said network;
   said network comprising a series resistance-capacitance circuit connected through a balancing terminal to a parallel resistance-capacitance circuit;
   the resistance values in said series and parallel circuits being equal and the capacitance values therein being equal whereby an alernating control voltage of one phase appears between said balancing terminal and said intermediate voltage point when the frequency of said input voltage increases from said predetermined value and an alternating control voltage of the opposite phase appears between said balancing terminal and said intermediate voltage point when said frequency decreases from said predetermined value, there being no alternating voltage difference between said balancing terminal and intermediate voltage point when said frequency equals said predetermined value;
   a phase sensitive detector for providing unidirectional output voltages of opposite polarities in response to alternating input voltages of respectively opposite phases;
   and means coupling said alternating control voltage to said phase sensitive detector to operate the latter but to isolate the same to prevent feedback of electrical effects therefrom to said balancing network.

2. In a frequency sensitive system for providing a D.C. output voltage indicative of deviation of the frequency of a variable frequency alternating input voltage from a predetermined value, the combination of:
   phase inverter and voltage divider means responsive to the alternating input voltage for providing an in-phase alternating voltage and an inverted-phase alternating voltage proportional thereto and for providing an intermediate alternating voltage point;
   a balancing network;
   means for applying said in-phase and inverted-phase voltages to opposite ends of said balancing network;
   said balancing network comprising a series resistance-capacitance circuit connected through a terminal to a parallel resistance-capacitance circuit and having selected values of resistance and capacitance to provide no voltage difference between said terminal and said intermediate point when the input voltage frequency equals said predetermined value and to provide alternating voltage of opposite phases therebetween in response to respectively upward and downward frequency deviations from said predetermined value;

a phase sensitive detector for providing unidirectional output voltages of opposite polarities for input alternating voltage applied thereto of respectively opposite phases;

and means for coupling said terminal and intermediate voltage point to said phase sensitive detector to operate the latter and for keeping feedback of disturbances from said detector to said balancing circuit to a minimum.

3. The invention defined in claim 2, wherein said phase inverter and voltage divider means comprises:
a cathode follower circuit having an electron discharge device and voltage dividing resistors connected in its anode and cathode circuits.

4. The invention defined in claim 2, wherein:
the resistances in said series and parallel circuits of said balancing network have equal values;
and the capacitances in said series and parallel circuits of said balancing network have equal values.

5. The invention defined in claim 4, wherein said voltage divider means comprises:
a pair of resistors, a first one of which has one-half the resistance value of the other one;
and means for applying said in-phase alternating voltage to both said parallel circuit and to said first resistor.

6. The invention defined in claim 2, wherein said voltage applying means comprises:
means for applying said in-phase voltage to said parallel circuit;
and means for applying said inverted-phase voltage to said series circuit.

7. The invention defined in claim 2, together with:
means for adjusting the resistance values in said series and parallel circuits in equal amounts and directions to change the frequency at which the voltage difference between said terminal and said intermediate point is of zero value.

8. The invention defined in claim 2, wherein said coupling means comprises a buffer amplifier.

9. The invention defined in claim 2, wherein said phase sensitive detector comprises:
terminals for receiving one or the other phase of said alternating voltage phases;
means responsive to said variable frequency input voltage for providing a reference voltage in phase with one of said phases of alternating voltage;
output terminals;
and means responsive to said reference voltage for shunting from said output terminals one-half of each cycle of the received voltage whereby to provide an output voltage of one polarity when the received voltage is in phase with the reference voltage and to provide an output voltage of the other polarity when the received voltage is of the opposite phase.

10. In a phase sensitive system for providing a D.C. output voltage indicative of the phase of an alternating input voltage, the combination:
input terminals and means for applying thereto an input alternating voltage of one phase or the opposite phase;
output terminals and means connecting said input terminals thereto;
means effective when operated for shunting the input voltage from said output terminals;
and means for operating said shunting means comprising:
means for providing a reference alternating voltage of the same frequency as the input voltage and in phase with one of said two phases of input voltage;
and means responsive to said reference voltage for controlling said shunting means on alternate half-cycles of reference voltage to shunt one-half of each cycle of the input voltage from said output terminals regardless of its phase thereby to provide unidirectional output voltages of opposite polarities in response to input voltages of respectively opposite phases.

11. The invention defined in claim 10, wherein said means for applying to said input terminals one or the opposite phase of input alternating voltage comprises:
a frequency sensitive system responsive to a variable frequency control voltage for providing said alternating voltage of one phase when the frequency of the control voltage increases from a preselected value and for providing said alternating voltage of opposite phase when the frequency of the control voltage decreases from the preselected value.

12. The invention defined in claim 10, wherein said shunting means comprises:
a transistor connected across said output terminals.

13. The invention defined in claim 12, wherein said means for controlling said shunting means comprises:
a unidirectional voltage source normally biasing said shunting transistor for conduction;
and a control transistor reponsive to each negative half-cycle of said reference voltage for rendering said shunting transistor nonconducting.

14. In a system for indicating deviation in the frequency of an alternating voltage source from a preselected value; in combination with a source of alternating voltage of variable frequency:
a resistance-capacitance bridge circuit of the Wein bridge type which is in balance for only one value of frequency;
means for deriving opposite phases of said alternating voltage of variable frequency and applying them to respective input terminals of said bridge circuit;
means in said bridge circuit responsive to deviation of said frequency from said preselected value for providing an alternating output voltage having one phase when the frequency deviates in one direction and having the opposite phase when the frequency deviates in the other direction;
and a phase sensitive detector responsive to said alternating output voltage for providing a positive unidirectional voltage when said output voltage has said one phase and for providing a negative unidirectional voltage when said output voltage has said opposite phase.

15. In a system for providing a D.C. output voltage in accordance with a frequency variation of an input signal voltage from a predetermined frequency value; the improvement comprising:
a frequency sensitive circuit responsive to said input signal voltage for providing a first phase output voltage when the frequency of said input signal voltage is higher than a predetermined value and for alternatively providing an opposite phase output voltage when the frequency of said input signal voltage is lower than said predetermined value;
means responsive to said input signal voltage for providing a reference alternating voltage coinciding with one of said phases of the output voltage;
a pair of input terminals connected to receive the output voltage from said frequency sensitive circuit;
and a phase sensitive detector connected to said output terminals and responsive to said reference voltage for shunting one-half of each cycle of said output voltage whereby an input frequency deviation in one direction produces an output voltage of one polarity and an input frequency deviation in the other direction produces an output voltage of the opposite polarity.

16. The invention defined in claim 15, wherein said frequency sensitive circuit comprises:
   means responsive to said input signal voltage for causing the output voltage to decrease to zero value when the frequency of said input signal voltage is at said predetermined value;
   and means for selectively adjusting said frequency sensitive circuit to change the frequency at which the output voltage decreases to zero value.

17. In a frequency sensitive system for providing a D.C. output voltage having a polarity indicative of the direction of frequency deviation from a predetermined value and a magnitude proportional to the amount of such deviation in a variable frequency alternating voltage, the combination of:
   means providing an adjustable input voltage with reference to ground which is proportional to the variable frequency voltage;
   a cathode follower circuit supplied from a unidirectional voltage source and comprising an electric discharge tube having an anode and a control electrode and a cathode, a resistor in the cathode circuit connected to ground and a resistor in the anode circuit having twice the resistance value of the cathode resistor;
   voltage divider means supplied from said unidirectional source and connected to said control electrode to bias said tube to conduction;
   means coupling said input voltage to said voltage divider means whereby to vary the conduction of said tube and to provide an in-phase alternating voltage at said cathode and an inverted-phase alternating voltage at said anode and an alternating voltage across said cathode resistor very nearly equal to the input voltage, while the inverted A.C. voltage across the anode resistor is exactly twice as much as the voltage across the cathode resistor;
   a balancing network having a series RC circuit connected from said anode to a terminal and a parallel RC circuit connected from said cathode to said terminal;
   a buffer amplifier comprising an electric discharge tube supplied from said unidirectional source and having an anode and a control electrode and a cathode;
   means connecting said terminal to the control electrode of said amplifier and means connecting the cathode of said amplifier to ground whereby the D.C. voltage across the cathode resistor of said cathode follower biases said amplifier to conduction;
   a phase sensitive detector;
   a coupling capacitor connecting said phase sensitive detector between the anode of said amplifier and ground;
   and the resistance and capacitance values of said RC circuits being respectively equal and selected so that an alternating voltage of one phase or the opposite phase is applied from said terminal to the amplifier in response to respective increase or decrease in the input voltage frequency from a predetermined value.

18. The invention defined in claim 17, wherein the resistors in said series and parallel circuits are adjustable to afford selection of the frequency from which deviation is to be detected.

References Cited
UNITED STATES PATENTS 2,770,726 11/1956 Fairweather _____ 328—134
3,003,122 10/1961 Gerhard _____ 307—88.5

ARTHUR GAUSS, *Primary Examiner.*

J. ZAZWORSKY, *Assistant Examiner.*